United States Patent

[11] 3,633,057

[72] Inventors Chester A. Smith;
William M. Stoddard, both of Holland, Mich.
[21] Appl. No. 56,935
[22] Filed July 21, 1970
[45] Patented Jan. 4, 1972
[73] Assignee General Electric Company

[54] STATOR HAVING IMPROVED WINDING DISTRIBUTION
7 Claims, 4 Drawing Figs.

[52] U.S. Cl.................................................. 310/184, 310/210
[51] Int. Cl..................................................... H02k 3/00
[50] Field of Search........................................... 310/184, 179, 180, 189, 188, 185, 198, 200, 210, 172, 166, 202, 203, 204, 205, 263; 172/275, 278; 171/206; 318/220

[56] References Cited
UNITED STATES PATENTS

| | | | | |
|---|---|---|---|---|
| 3,421,033 | 1/1969 | Hoffmeyer | | 310/172 |
| 3,421,034 | 1/1969 | Hershberger | | 310/172 |
| 2,485,628 | 10/1949 | Morrill | | 310/180 |
| 2,498,704 | 2/1950 | Oswald | | 172/275 |
| 3,235,762 | 2/1966 | Brammerlo | | 310/185 |
| 2,399,931 | 5/1946 | Lamborn | | 310/184 |

Primary Examiner—J. D. Miller
Assistant Examiner—R. Skudy
Attorneys—John M. Stoudt, Ralph E. Krisher, Jr., Radford M. Reams, Frank L. Neuhauser and Oscar B. Waddell ABSTRACT: A stator includes a slotted magnetic core supporting first (e.g., main) and second e.g., auxiliary) windings. The main and auxiliary windings are each referred to as including at least first and second coil groups, whether the windings are wound in place, formed as a single coil group and then placed in the slots, formed as two or more groups prior to placement in the slots, or formed by any other suitable method. One of the auxiliary winding coil groups has at least the end turns thereof adjacent one of the core end faces disposed along a first portion of the core and extending along a preselected arcuate region of the core, and a second one of the auxiliary winding coil groups has at least the end turns thereof adjacent the same core end face disposed along the first portion of the core and within the preselected arcuate region. The main winding includes end turns adjacent the auxiliary winding end turns. Preferably, at least the greater part of the main winding end turns adjacent the same above-referred-to core end face extend in the same preselected arcuate region.

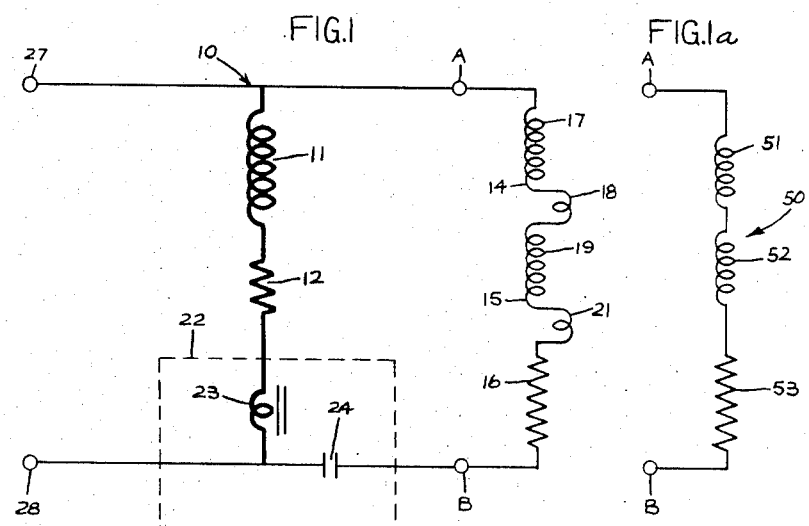
FIG.1
FIG.1a
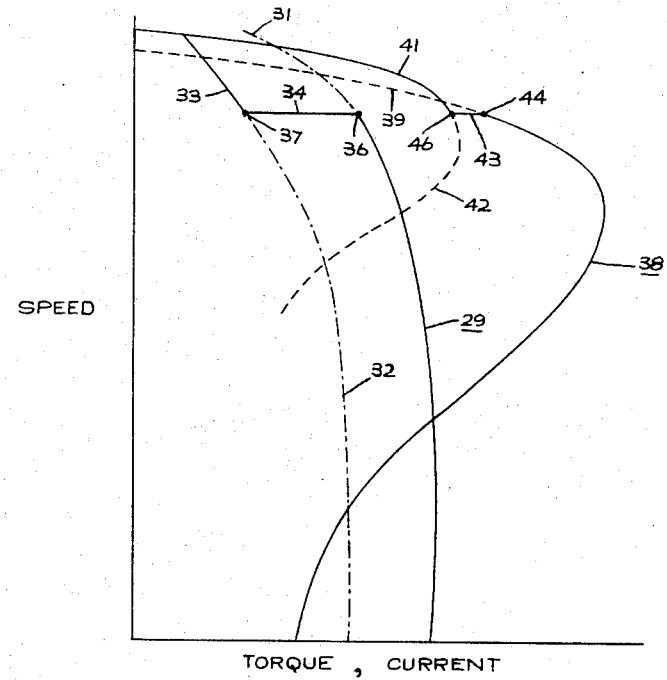
FIG.2
INVENTORS:
Chester A. Smith,
William M. Stoddard,
BY Ralph E. Krisher Jr.
Attorney.

INVENTORS:
Chester A. Smith,
William M. Stoddard,
BY Ralph E. Krisher Jr.
Attorney.

STATOR HAVING IMPROVED WINDING DISTRIBUTION

CROSS-REFERENCE TO RELATED APPLICATIONS

Application Ser. No. 805,625, filed Mar. 10, 1969 in the name of William R. Hoffmeyer titled "STATOR SLOT AND WINDING ARRANGEMENT" now abandoned, and William R. Hoffmeyer application Ser. No. 56,926 titled "STATOR SLOT AND WINDING ARRANGEMENT" filed on the same day as this application as a continuation-in-part of said Hoffmeyer application Ser. No. 805,625 are related applications.

BACKGROUND OF THE INVENTION

This invention relates to stators having improved winding distributions for use in alternating current dynamoelectric machines, and, more particularly, to improved stators especially manufactured for use in compressor and the like applications.

As pointed out in the aforementioned Hoffmeyer applications, because of economic and weight considerations, it is desirable to provide stators with cores having yoke sections as small as practicable for the desired electrical and magnetic characteristics. It will be appreciated by persons skilled in the art that when motors are used in various applications, e.g., compressor units, it is often desirable to provide areas of the stator core end faces substantially free of windings (including end turns) for use with mounting pads or other means that are used in securing the stator core to a supporting structure.

Resistance split phase motors are one of the general types of motors commonly selected for use in compressor applications. As is well known, resistance split phase motors employ both main and auxiliary windings with the auxiliary winding normally being energized only during starting conditions of the motor. During starting conditions, the difference in the resistance-to-reactance ratios of the main and auxiliary windings results in a phase difference between the magnetic fields associated with each winding and provides a starting torque for the motor. Then, after a predetermined operating condition is attained, the auxiliary winding is disconnected from the power source and deenergized.

One technique often used for selectively energizing the auxiliary winding in compressor applications is to connect the coil of an external relay in series with the main winding and connect the normally open contacts of the relay in series with the auxiliary winding. When the motor is first energized, the locked rotor current of the main winding flows through the relay coil and causes the relay to pick up and close the relay contacts. Thus, the auxiliary winding is energized. Then, as the motor accelerates, the current in the main winding circuit decreases, the relay drops out and opens its contacts, and the auxiliary winding is deenergized.

Typically, commercially available relays suitable for this type of application dropout when the relay coil current drops to about 80 percent of the minimum pickup current value. Since the auxiliary and main windings are connected in parallel across the power source when the relay contacts are closed, it is desirable to assure that the resistance of the auxiliary winding is of sufficient magnitude that the relay does not inadvertently drop out because of the shunting affect of the auxiliary winding when the relay contacts first close. It will, therefore, be understood that it is desirable for the auxiliary winding to have a relatively high resistance for this, as well as other reasons.

One of the early, but space-consuming and expensive, approaches for increasing the resistance of an auxiliary winding involved connecting an external resistor in series circuit relation with the auxiliary winding. Another approach has been to increase the auxiliary winding resistance by reducing the size of the auxiliary winding conductor. This approach is limited in practice however, because, for a given auxiliary winding current flow, the auxiliary current density (in amperes per square inch of conductor) increases as the winding conductor size is decreased. Furthermore, the temperature rise of the auxiliary winding, e.g., under locked rotor conditions, is a function of the current density, among other things. Thus, efforts must be made to avoid excessive auxiliary winding current densities and especially in applications such as hermetically sealed compressors where adequate dissipation of heat from the auxiliary winding may be difficult to attain.

As one example, in hermetically sealed compressor systems, it is particularly difficult to dissipate heat from the motor windings under locked rotor conditions. For example, in one specific hermetically sealed compressor application, it has been determined that the copper auxiliary winding current density should be less than 40,000 amperes per square inch of conductor and, preferably, be less than about 35,000 amperes per square inch of conductor.

Accordingly, wire having a sufficiently large diameter to avoid excessive current densities is normally used. Since larger diameter conductor has a lower total resistance per unit length, the total auxiliary winding resistance desired for satisfactory relay operation is then obtained by providing additional turns of auxiliary winding and thus increasing the total length of the winding. However, since the additional turns would change the actual effective number of turns from a preselected number if all of the additional turns were wound in a common direction, half of the additional turns are usually wound in a forward direction and half of the additional turns are wound in a reverse direction.

Because of this reverse winding technique, this last approach has been called a "backlash" winding arrangement. The problems associated with this approach are the increase in the volume of auxiliary winding conductor material that must be used and the increased manufacturing time that must be allocated for winding additional forward turns, stopping the winding equipment, and then winding the necessary backward or backlash turns.

Also of importance is the fact tat the increased amount of auxiliary winding conductor and increased total number of auxiliary winding turns makes it even more difficult to provide at least portions of the end face area of a stator core free of winding turns so as to provide a desired open mounting area.

SUMMARY OF THE INVENTION

It is, therefore, a general object of the present invention to provide an improved dynamoelectric machine stator having an improved winding distribution.

It is another object of the present invention to provide an improved stator that is characterized by an acceptable level of operating efficiency when used in refrigeration-compressor system applications.

It is a further object of the present invention to provide an improved winding distribution for a stator that permits a reduction in the volume of winding material that may be used with a given stator core while retaining desirable characteristics for the stator.

It is a still further object of the present invention to provide a dynamoelectric machine stator having an improved winding arrangement wherein desired portions of at least one of the stator core end faces is substantially free of windings in order to facilitate securing the stator core to supporting structure and wherein the main windings of the stator may be formed by conventional winding equipment.

It is yet another and more specific object of the present invention to provide an improved dynamoelectric machine stator wherein a winding having a relatively high resistance and relatively low inductance is arranged with the end turns of one coil group spanning a first arcuate region of at least one end face of the stator core and wherein substantially all of the end turns of a second coil group thereof adjacent the same end face are disposed within such arcuate region.

In carrying out the objects of the invention in one form, we have provided an improved stator with an improved winding distribution that may be used to particularly good advantage in compressor an the like applications. The exemplification, in one form, includes a core of magnetic material having a plurality of substantially angularly spaced-apart, coil-accommodating slots. Disposed in the slots are the side turn portions of a first or main winding arranged about a first radial polar axis and a second or auxiliary quadrature winding arranged generally concentrically about a second radial polar axis which in the illustrated exemplification is spaced substantially 90 electrical degrees from the first polar axis. For ease of description, the main and auxiliary windings disposed in selected ones of the coil accommodating slots are each referred to as including at least first and second coil groups, whether the windings are wound in place, formed as a single coil group and then placed in the slots, formed as two or more groups prior to placement in the slots, or formed by any other suitable method. One of the auxiliary winding coil groups has at least the end turns thereof adjacent one of the core end faces disposed along a first portion of the core and extending along a preselected arcuate region of the core, and a second one of the auxiliary winding coil groups has at least the end turns thereof adjacent the same core end face disposed along the first portion of the core and within the preselected arcuate region. The preselected arcuate region is of an arcuate extent to encompass two main winding polar axes and a secondary winding polar axis adjacent to and between the two main winding polar axes. At least some of the side turn portions of an auxiliary winding coil group are disposed beyond the two polar axes, associated with the first or main winding. The main winding also includes end turns adjacent the auxiliary winding end turns and, preferably, at least the greater part of the main winding end turns adjacent the same above-referred-to core end face extend in the same preselected arcuate region.

In the illustrated exemplification, the auxiliary winding has a relatively high resistance and relatively low inductance, as compared to the main winding, and is used as a start winding in a resistance split phase motor. With the preferred winding arrangement, the arcuate extent of the end turns of the auxiliary winding tends to cause a desirable increase in the resistance of the auxiliary winding. The exemplification exhibits improved characteristics and other advantages as compared to other resistance split phase motors using a similar stator but not embodying the present invention. These improvements and advantages include an increase in efficiency, a reduction in the total amount of conductor material used for the windings, and improved manufacturability with presently available motor manufacturing equipment.

The subject matter which we regard as our invention is set forth in the appended claims. The invention itself, however, together with further objects and advantages thereof may be better understood by referring to the following more detailed description taken in conjunction with the accompanying drawings.

BRIEF DESCRIPTION OF THE DRAWINGS

FIG. 1 is a simplified schematic diagram for a resistance split phase motor provided with a conventionally represented main winding and a conventionally represented backlash-type auxiliary winding, and a current relay having the relay coil in series with the main winding and the relay contacts in series with the auxiliary winding;

FIG. 1a is a simplified schematic diagram for the auxiliary winding of a motor constructed according to an exemplification of the invention disclosed herein;

FIG. 2 is a graph of representative speed-torque and speed-current curves for resistance split phase motors particularly suitable for compressor and the like applications;

DESCRIPTION OF THE PREFERRED EMBODIMENTS

Figure 3:
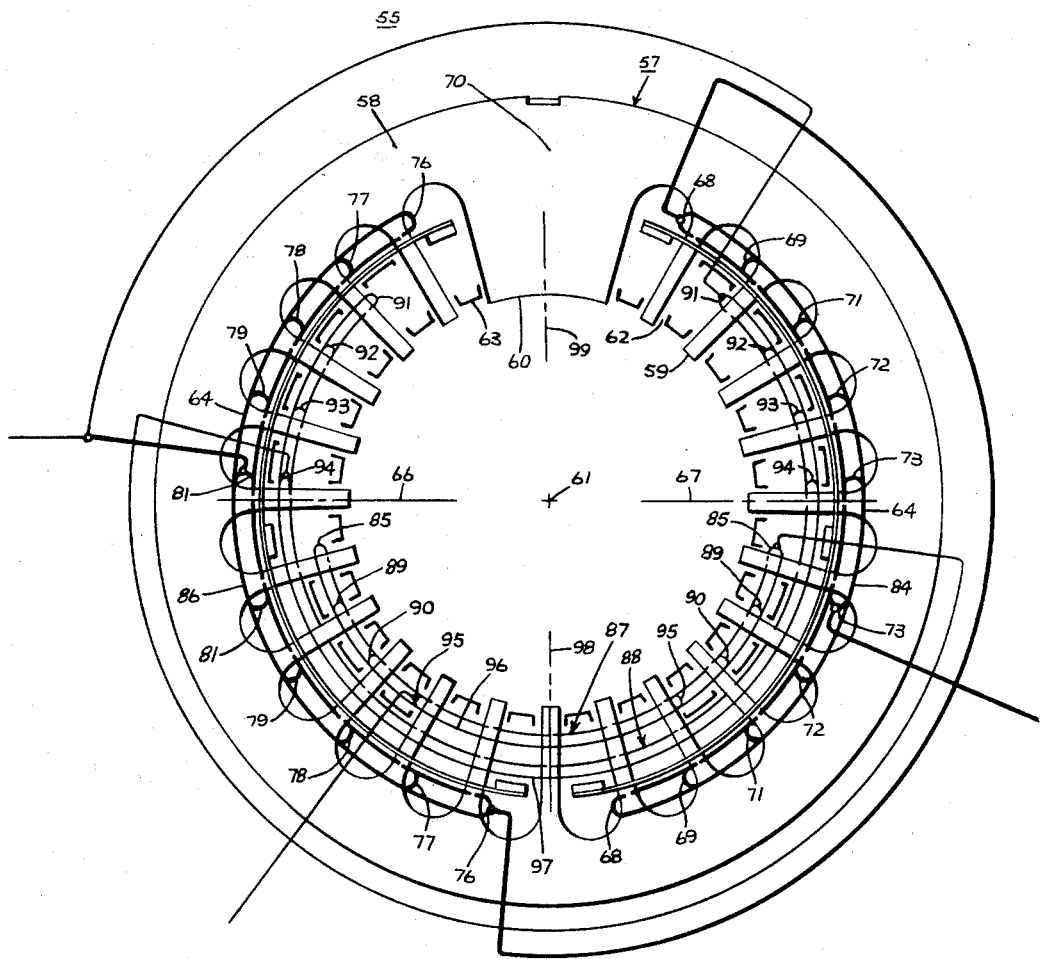
FIG. 3 is an end elevational view of a stator, partially in schematic form, to illustrate one embodiment of the present invention incorporated in a two-pole resistance split phase motor.

Referring now to the drawings in more detail and particularly to FIG. 1, there is illustrated a simplified schematic diagram 10 for the stator windings of a resistance split phase motor having a backlash auxiliary winding arrangement as has been arranged heretofore. A main winding is characterized schematically as an inductance 11 and resistance 12. An auxiliary winding is schematically illustrated as including two coil groups having an inductance 14, 15, respectively, and a series resistance 16.

One of the auxiliary coil groups includes winding turns wound in a forward direction represented by inductance 17, and backlash winding turns wound in a reverse direction represented by inductance 18. The other auxiliary coil group also includes winding turns wound in a forward direction and backlash winding turns, respectively represented by inductances 19, 21.

For ease of description and correlation of FIG. 1 with FIG. 1a, the terminal points A and B have been used to indicate the points in the circuit of FIG. 1 at which the auxiliary winding circuit of FIG. 1a is to be connected in lieu of the auxiliary winding circuit made up of inductances 14, 15 and resistance 16.

A conventional current relay, of the type commonly used with resistance split phase motors in compressor applications, is schematically represented in FIG. 1 at 22 and includes a current coil 23 connected in series with the main winding and normally open contacts 24 connected in series with the auxiliary winding circuit. Typically, the current relay is mounted externally of the motor, and when a source of excitation voltage is applied across the terminals 27, 28, the locked rotor current flowing through the relay coil 23 causes the relay to pick up and close the contacts 24 whereupon source voltage is applied to the auxiliary winding circuit across connections points A, B. Then, as the motor accelerates, the main current falls off to a point below the dropout voltage of the relay, the relay contacts once again open, and the auxiliary winding circuit is deenergized.

By way of illustration, in one type of application, the current relay picks up when the relay coil current is about 12 amperes and drops out when the coil current of the relay falls to about 80 percent of the pickup current, or to about 10 amperes.

The speed-current and speed-torque relationship for resistance split phase motors has been generally illustrated by the curves shown in FIG. 2. In this figure, curve 29 is a general representation of the main winding current supplied to a resistance split phase motor and indicates the relationship between the speed of the motor and main winding current supplied thereto.

The first segment of the curve 29 up to the point 36 corresponds to a motor-operating condition while current is supplied to both the main and auxiliary windings. The dashed line curve segment 31 represents the current that would be supplied to the main winding at speeds above the speed corresponding to point 36 if both the auxiliary and main windings were continued to be energized. Similarly, the broken line curve segment 32 represents the current that would be supplied to the main winding if the auxiliary winding were not energized, assuming, of course, that the motor were running and was not stalled in a locked rotor condition.

The solid segment 33 of the curve 29 illustrates the relationship between current and speed of the motor after the auxiliary winding has been deenergized, and the segment 34 represents the drop in main winding current that occurs when the auxiliary winding is deenergized. The segment 34 between points 36 and 37 is shown as being horizontal for purposes of illustration and description, but it will be appreciated that in actual practice the segment 34 would probably not be either horizontal or a straight line segment since the main winding current would not instantaneously change when the auxiliary winding is deenergized.

Still having reference to FIG. 2, the curve 38 graphically represents the torque produced during starting conditions with both the main and auxiliary winding circuits energized. As has been done in the case of curve 29, a dotted curve segment 39 illustrates a speed-torque relationship for continued energization of the auxiliary winding above the speed corresponding to points 44 and 36. The segment 41 of the speed-torque curve 38 represents the running torque associated with continued energization of the main winding after deenergization of the auxiliary winding, whereas the dashed line segment 42 graphically illustrates the reduction in torque produced only by the main winding that would occur if the speed were reduced below the speed corresponding to point 46. For purposes of illustration, the segment 43 connecting points 44, 46 has been drawn as a horizontal line to indicate the torque drop associated with deenergization of the auxiliary winding. However, under actual operating conditions a change in speed would occur between points 44 and 46.

Now having reference to both FIGS. 1 and 2, it will be appreciated that, although FIG. 2 represents the relationship between motor speed, main winding current, and motor output torque, curves such as those here shown may be used to determine the operational conditions at which the auxiliary windings should be deenergized. Since a relay, such as the one schematically represented in FIG. 1 is responsive to current conditions in the main winding, it is normally desirable to modify or tailor the series resistance such as resistance 16 in FIG. 1 or resistance 53 in FIG. 1a so that the relay will drop out and deenergize the auxiliary winding of a particular motor at a speed corresponding to a selected point on the speed-torque curve for that particular motor.

As previously mentioned, various approaches for obtaining a desired relatively high resistance of an auxiliary winding have included decreasing the actual size of the auxiliary winding electrical conductor to a size such that the current density therein would not be so great as to cause an objectional temperature rise which, for two specific applications, is about 13.3° F. per second and 18° F. per second, respectively.

Then, assuming that the resistance of the auxiliary winding should be further increased, the total length of wire used in the auxiliary winding is increased. However, since an increased number of winding turns for a given motor design would change the inductance of the winding if all of the turns were wound in the same direction, half of the additional auxiliary winding turns are wound in a forward direction and a corresponding number of additional turns have been wound in a reverse direction to form a backlash winding. The inductances associated with such backlash winding turns are shown at 18 in FIG. 1.

Because of the problems and expense discussed related to backlash windings, it will be understood that it is desirable to provide an improved winding arrangement wherein the total inductance and resistance between points A and B in FIG. 1 may be retained while substantially reducing or eliminating the number of backlash winding turns 18, 21. It would also be desirable, and particularly so for compressor applications, to provide an arrangement that leaves a stator core end face area free of windings so that it may be advantageously used in mounting the motor in a compressor unit. The illustrated exemplifications of our invention embody an arrangement that provides these desirable advantages, and a schematic equivalent circuit of one specific exemplification is shown in FIG. 1a. It will be noted from an inspection of FIG. 1a that no backlash windings have been used. Furthermore, when the circuit of FIG. 1a is connected to the main winding and relay circuit of FIG. 1 at points A and B in lieu of the conventional arrangement, the improved arrangement provides sufficient resistance 53 for satisfactory operation of the relay 22.

Referring now to FIG. 3 in more detail, one form of our invention is illustrated in connection with a stator 57 for use in a resistance split phase motor. In the exemplification, the stator was particularly designed for a motor designed for two-pole operation with the motor including a conventional not shown rotor. The stator 57 includes a laminated core of magnetic material formed from a predetermined number of identical stacked laminations that may be punched, stamped, or otherwise formed from suitable magnetic material. For convenience and simplification of disclosure, the same designation will be used hereinafter to identify the components of the individual laminations and the corresponding structure they form when the laminations are in stacked relation. The core 57 includes a main or yoke section 58 and plurality of teeth 59 which extend radially inwardly from the yoke to form a circular or cylindrical rotor-receiving bore 60. The bore has a central axis 61 which extends longitudinally of the core.

In addition, teeth 59 form between them a plurality of angularly spaced-apart, coil-accommodating slots 62 which, in the illustrated exemplification, are substantially identical. Each slot is provided with a conventional slot liner that will be described in more detail in connection with the embodiment of FIG. 4 and which has been omitted in FIG. 3 for clearness of disclosure.

A main winding generally indicated at 64, of the distributed type is received in certain ones of the slots 62 as illustrated. The turns of the winding are arranged to form two magnetic poles of instantaneously opposite polarity. Each of these poles has a radial polar axis, indicated by the dashed lines 66 and 67. Although the axes 66, 67 have been shown spaced apart about 180 electrical degrees, the specific exemplification that will be given hereinafter had a winding distribution such that the main winding poles were spaced other than 180 electrical degrees apart.

Still having reference to FIG. 3, the winding 64 includes two coil groups arranged concentrically with one coil group being arranged concentrically about the polar axis 66 and the other coil group arranged concentrically about the polar axis 67. The first of these coil groups includes five coils 68, 69, 71, 72 and 73 which are respectively received in the slots 62 as illustrated. The other coil group includes five coils 76, 77, 78, 79, and 81. Thus the distributed winding 64 is positioned around an arcuate region of the core having an arcuate extent of about 330 electrical degrees and extending from either side of a second preselected arcuate region 70 of the core of about 30 electrical degrees which is substantially free of winding turns and may be used for mounting the core to suitable supporting structure.

Some of the slots 62 are also provided with an auxiliary winding, in the exemplification the auxiliary winding being illustrated as a start winding including two coil groups arranged concentrically about a quadrature axis indicated by the dashed lines 98, 99 and spaced approximately 90 electrical degrees from the axis defined by polar axes 66, 67. Although reference is made herein to two coil groups, it will be understood that this is done for ease of description of the auxiliary winding as it appears, in place, in selected ones of the slots 62. This is not meant to imply that the auxiliary winding is necessarily formed of two separately wound coil groups that are then positioned on the core 57. In fact, the auxiliary winding may be wound in place on the core 57 or wound as a single group of coils or two or more groups of coils that are then positioned in the appropriate slots by any suitable method.

With this understanding, the auxiliary winding is illustrated as including two coil groups indicated generally at 87 and 88. The coil group 87 consists of four coils 85, 89, 90 and 95 of the auxiliary winding and the coil group 88 consists of four coils 91, 92, 93, and 94. Each of the coils may include, depending on the given application, one turn or a plurality of turns of electrical conductor.

As shown in FIG. 3, the auxiliary winding defines a preselected arcuate region of the core greater than 180 electrical degrees, i.e., of about 330 electrical degrees which is approximately, but not necessarily, coextensive with an arcuate region of the core defined by the main winding 64 and end turns thereof. It will also be noted that the preselected arcuately extending region 70 of the core is free of auxiliary winding turns.

The following example is given in order to illustrate more clearly the relationship between the main and auxiliary windings and the core of an actual embodiment of the invention. It will be understood that in the example, the main winding was formed from 0.0285-inch diameter copper wire and the auxiliary winding was formed from 0.0159-inch diameter copper wire. The number of turns for each coil were as follows:

Main Winding

| Coil No. | No. of Turns |
|---|---|
| 68 | 85 |
| 69 | 55 |
| 71 | 43 |
| 72 | 38 |
| 73 | 25 |
| 76 | 85 |
| 77 | 55 |
| 78 | 43 |
| 79 | 38 |
| 81 | 25 |

Auxiliary Winding

| Coil No. | No. of Turns |
|---|---|
| 85 | 44 |
| 89 | 38 |
| 90 | 26 |
| 95 | 20 |
| 91 | 20 |
| 92 | 26 |
| 93 | 38 |
| 94 | 44 |

It will be noted that in the foregoing specific example, no backlash auxiliary winding coil turns were used. However, end turns of all of the auxiliary winding coils were pulled back and across the radial polar axis 98.

Test results of motors constructed according to the illustrated exemplification indicated that among the advantages obtained were an increase of efficiency, the use of less conductor material, a reduction in slot and end turn space factors, identical main poles which may be wound and placed with conventional equipment, and the provision of adequate resistance in the auxiliary winding circuit to provide for satisfactory performance of a relay such as the previously discussed relay 22. In addition, current density in the auxiliary winding was less than 35,000 amperes per square inch.

In order to provide a basis for evaluating the significance of tested characteristics of the above example of a specific exemplification, the structural details of a motor constructed for testing and evaluation but not embodying the invention will now be described and referred to hereinafter as the "set 1 motor."

Both of the motors were constructed with a ⅞-inch stack height of laminations, with each lamination being substantially identical and as shown in FIG. 3. The laminations had an outer diameter of about 4.8 inches and a bore of about 2.4 inches. Furthermore, the same rotor was used in each test in order to avoid variations in test results that might result from using different rotors.

In order to set forth more clearly the winding distribution of the set 1 motor reference to each of the 22 winding slots of the motor will be made hereinafter. The 22 slots corresponding to the slots of the core 57 will be referred to as slots 1 through 22 respectively, starting from the arcuate region 70 of the core 57 and moving in a clockwise direction around FIG. 3. Thus, coil 68 of the embodiment was disposed in slots 1 and 11, and coil 76 was positioned in slots 12 and 22.

In the set 1 motor, the first and second main winding poles were each formed from 0.0320-inch diameter copper wire, whereas the auxiliary winding was formed from 0.0159-inch diameter copper wire. Furthermore, a first auxiliary winding coil group of the set 1 motor was concentrically positioned about an auxiliary winding radial polar axis passing generally through slot number 6 and a second auxiliary winding coil group was positioned concentrically about an auxiliary winding radial polar axis passing generally through slot number 17.

Two main winding coil groups of the set 1 motor were both placed concentrically about a main winding radial polar axis passing generally through the tooth separating slot number 11 and slot number 12. The end turns of both of the main winding coil groups were pulled together to form a single end turn bundle extending across the radial polar axis disposed between slots 11 and 12.

The winding distribution for the set 1 motor was as follows:

Set 1 Motor

| Slots Occupied | No. of Turns |
|---|---|
| First Main Winding Coil Group | |
| 1, 22 | 24 |
| 2, 21 | 32 |
| 3, 20 | 42 |
| 4, 19 | 48 |
| 5, 18 | 52 |
| Second Main Winding Coil Group | |
| 10, 13 | 24 |
| 9, 14 | 32 |
| 8, 15 | 42 |
| 7, 16 | 48 |
| 6, 17 | 52 |
| First Auxiliary Winding Coil Group | |
| 4, 8 | 25 |
| 3, 9 | 38 |
| 2, 10 | 46 |
| 1, 11 | 79 forward, (32 backlash) |
| Second Auxiliary Winding Coil Group | |
| 19, 15 | 25 |
| 20, 14 | 38 |
| 21, 13 | 46 |
| 22, 12 | 79 forward, (32 backlash) |

It will be understood from the above that a total of 111 auxiliary winding turns were placed in each of slots 1, 11, 22, and 12; but that the 32 backlash turns and 32 of the forward turns were provided to increase the total resistance of the auxiliary winding.

A comparison of some of the characteristics of the set 1 motor and a motor constructed according to the FIG. 3 exemplification that were determined during testing are as follows:

| | Set 1 | FIG. 3 Exemplification |
|---|---|---|
| Maximum running torque | 8.0 oz. ft. | 7.9 oz. ft. |

| | | |
|---|---|---|
| Locked rotor torque | 4.0 oz. ft. | 3.4 oz. ft. |
| Full load efficiency | 53.3% | 62.7% |
| Full load power factor | 53.7% | 61.8% |
| Full load motor current | 2.9 amperes | 2.1 amperes |
| Power input at full load | 178 watts | 151 watts |
| Amount of copper in main windings | 1.42 lbs. | 1.03 lbs. |
| Amount of copper in auxiliary windings | 0.28 lbs. | 0.21 lbs. |
| Total amount of copper | 1.70 lbs. | 1.24 lbs. |
| Main winding resistance | 4.77 ohms | 5.52 ohms |
| Auxiliary winding resistance | 15.1 ohms | 11.6 ohms |

The test results set forth above clearly illustrate that, as compared to the set 1 motor, a motor embodying our invention was over 17 percent more efficient while operating under full load conditions, and yet required the use of only about 73 percent as much copper in the windings. Furthermore, the current density in the start winding was only about 34,500 amperes per square inch of conductor under locked rotor conditions.

It will be appreciated from the foregoing that we have provided an improved arrangement, in a preferred form of which a first auxiliary coil group (in other words, a first section of the auxiliary winding) has the end turns thereof adjacent at least one of the core end faces extending along a first portion of the core and along a preselected arcuate region of the core. A second auxiliary winding coil group (or section) adjacent the same core end face is disposed within the same preselected arcuate region of the core.

Although the coils 68 and 76 of the main winding first and second coil groups (or sections) are not disposed within this same preselected arcuate region, the greater part of the end turn portions of the main winding do extend in the preselected region.

Furthermore, although the preselected arcuate region is somewhat less than 330 electrical degrees in the exemplification of FIG. 3, it is preferred that the arcuate extent of such region not be substantially greater than 330 electrical degrees so that an arcuate region of the core of at least about 30 electrical degrees in extent will be available for mounting purposes. On the other hand, if the preselected arcuate extent of auxiliary winding is substantially less than that shown in FIG. 3 for a single-phase two-pole resistance split phase motor, the mean length of the auxiliary winding end turns may be reduced an amount such that a relay, e.g., relay 22 will not operate properly. For the meaning of "mean length" of coil end turns, reference is made to Shaffer U.S. Pat. No. 3,154,708, which is assigned to the assignee of this application. In addition, if the preselected arcuate region 70 in the exemplification is substantially greater than 30 electrical degrees, motor efficiency is dramatically reduced. It is believed that one factor contributing to reduced performance characteristics is due to changes in the harmonic content of the space flux components of the excited coil groups during motor operation.

Figure 4:
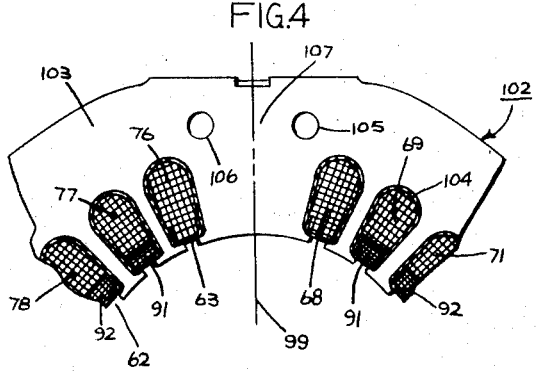
FIG. 4 is an end elevational view, with parts in section and parts broken away, of another embodiment of the invention.

In FIG. 4 there is shown another embodiment of the invention, with parts in section and parts broken away. The main and auxiliary windings and winding distribution are identical in FIGS. 3 and 4 and, accordingly, identical reference numerals have been used to identify like parts in both figures.

The core 102 includes a yoke section 103 and slots 62. Each slot is provided with a conventional slot liner 104, and these slot liners 104 extend longitudinally through the core along the lateral surfaces of the slots. In order to prevent the winding forming wires received in the slots from being injured by contact with the laminations forming the core, these liners 104 also extend longitudinally outwardly from each end of the core.

We have also provided a preselected region of the core 107 which is free of winding turns (including end turns). This region 107 is shown as having an arcuate extent of about 30 electrical degrees. Means that may be used in mounting the core 102 to a supporting structure are illustrated as passageways 105, 106 extending longitudinally through the core 102 and these may be used to receive mounting bolts or other suitable fastening means. This embodiment, like the FIG. 3 exemplification, also provides the advantage of an arrangement which provides sufficient slot space to accommodate the outermost coil turns of the main winding.

While we have shown and described what at present is considered to be the preferred embodiments of our invention in accordance with the patent statutes, changes may be made in the illustrated embodiments without actually departing from the true spirit and scope of the invention.

Although the invention has been illustrated and described in connection with a specific exemplification for a single-phase, two-pole, resistance split phase motor application, it will be understood by those skilled in the art that the invention and benefits derived therefrom may be incorporated in other types of stators having winding coil groups or sections forming at least two poles. We therefore intend to cover in the following claims all such equivalent variations as fall within the invention.

What we claim as new and desire to secure by Letters Patent of the United States is:

1. For use in a single-phase alternating current motor; a core of magnetic material having a plurality of angularly spaced-apart, coil-accommodating slots and a pair of end faces; at least two main coil groups arranged in a number of the slots defining at least two predetermined primary magnetic poles; said at least two main coil groups having an inductance and a resistance, with each of said at least two predetermined primary magnetic poles having a radial polar axis, and with the radial polar axes being angularly spaced apart around said core; and at least two auxiliary coil groups arranged in a number of said slots defining at least two secondary predetermined magnetic poles; said at least two auxiliary coil groups having a resistance greater than the resistance of said at least two main coil groups and having an inductance less than the inductance of said at least two main coil groups; each of the at least two secondary predetermined magnetic poles having a radial polar axis angularly spaced from the individual radial polar axes of the at least two main coil groups; said coil groups of the auxiliary winding including winding end turns; one of the coil groups of the auxiliary winding having at least the end turns thereof adjacent one of the core end faces disposed along a first portion of the core and extending along a preselected arcuate region of a first arcuate extent of the core, and a second one of the coil groups of the auxiliary winding having at least the end turns thereof adjacent said one of the core end faces disposed along said first portion of the core and disposed along a second arcuate extent within said preselected arcuate region, the first arcuate extent being greater than the second arcuate extent and being at least 180 electrical degrees.

2. The invention as set forth in claim 1 wherein said preselected arcuate region is not substantially greater than about 330 electrical degrees.

3. The invention as set forth in claim 1 wherein the at least two coil groups of the main winding include end turn portions disposed adjacent the end turns of the coil groups of the auxiliary winding, and the greater part of which extend in said preselected arcuate region.

4. For use in an alternating current motor; a core of magnetic material having a plurality of angularly spaced-apart, coil-accommodating slots; a first winding arranged in at least some of the slots and including at least two coil groups defining at least two spaced-apart predetermined magnetic poles each having a polar axis; said first winding having an inductance and a resistance; and a second winding including at least two coil groups arranged in at least some of said slots to define at least two other spaced-apart predetermined magnetic poles electrically displaced from the at least two predetermined magnetic poles of said first winding and each having a polar axis; said second winding having a resistance greater than the resistance of said first winding and having an inductance less than the inductance of said first winding; said coil groups of the second winding including end turns and having at least some side turn portions thereof disposed beyond two polar axes associated with the first winding that are next adjacent to one polar axis associated with the second winding, one of the coil groups of the second winding having at least the end turns thereof, which are arranged at one end of the core, disposed along a first portion of the core and extending along a preselected arcuate region of a first arcuate extent; a second one of the coil groups of the second winding having at least the end turns thereof, which are arranged at said one end of the core, disposed along said first portion of the core and disposed along a preselected arcuate region of a second arcuate extent within said preselected arcuate region; the first arcuate extent being greater than the second arcuate extent, with the first arcuate extent encompassing the one polar axis associated with the second winding and the two polar axes associated with the first winding that are next adjacent to the one polar axis.

5. The invention as set forth in claim 4 wherein said preselected arcuate region is not substantially greater than about 330 electrical degrees.

6. The invention as set forth in claim 4 wherein the at least two coil groups of the first winding include end turn portions disposed adjacent the end turns of the coil groups of the second winding, and the greater part of which extend in said preselected arcuate region.

7. The invention as set forth in claim 4 wherein the electrical displacement of each of the at least two other spaced-apart predetermined magnetic poles of the second winding with respect to each magnetic pole of the first winding is approximately 90 electrical degrees.

* * * * *